United States Patent
Cattaneo

(10) Patent No.: US 11,028,930 B2
(45) Date of Patent: Jun. 8, 2021

(54) SINGLE CONTROL MIXER VALVE STRUCTURE FOR TAPS AND FITTINGS

(71) Applicant: Piero Cattaneo, Cavaglio d'Agogna (IT)

(72) Inventor: Piero Cattaneo, Cavaglio d'Agogna (IT)

(*) Notice: Subject to any disclaimer, the term of this patent is extended or adjusted under 35 U.S.C. 154(b) by 0 days.

(21) Appl. No.: 16/417,434

(22) Filed: May 20, 2019

(65) Prior Publication Data
US 2019/0353259 A1 Nov. 21, 2019

(30) Foreign Application Priority Data
May 21, 2018 (IT) .......................... 102018000005546

(51) Int. Cl.
*F16K 11/078* (2006.01)
*F16K 11/074* (2006.01)
*F16K 47/02* (2006.01)

(52) U.S. Cl.
CPC ........ *F16K 11/0787* (2013.01); *F16K 11/074* (2013.01); *F16K 47/026* (2013.01);
(Continued)

(58) Field of Classification Search
CPC .. F16K 11/0787; F16K 11/074; F16K 47/026; Y10T 137/86831; Y10T 137/86815; Y10T 137/87579
(Continued)

(56) References Cited

U.S. PATENT DOCUMENTS 3,433,264 A * 3/1969 Parkison ............. F16K 11/0787
137/625.17
4,218,041 A * 8/1980 Bernat .................... F16K 47/02
251/127
(Continued)

FOREIGN PATENT DOCUMENTS

CH 630711 A5 6/1982
DE 3012547 A1 10/1981
(Continued)

OTHER PUBLICATIONS

Italian Patent Office Search Report and Written Opinion dated Jan. 18, 2019 (partially in English).
(Continued)

*Primary Examiner* — Umashankar Venkatesan
(74) *Attorney, Agent, or Firm* — Hedman & Costigan, P.C.; James V. Costigan; Kathleen A. Costigan

(57) ABSTRACT

A single control mixer valve structure for taps and fittings comprising a fixed disk provided with an outlet port and two ports, respectively, one for the hot water and the other for the cold water that come from two inlet openings, formed in a base, mounted in which is the fixed disk on which a mobile disk mounted in a mobile-disk holder is able to slide; the mobile-disk holder and the mobile disk define a mixing opening, which is adapted to connect the inlet openings with an outlet opening, formed in the base, in a position corresponding to the outlet hole on the fixed disk, from which the mixed water flows out; sliding of the mobile disk on the fixed disk causes partial opening or complete closing of one or both of the ports of the fixed disk, thus adjusting the amount of hot water and cold water that passes from the inlet openings to the outlet opening for the mixed water; the mixer valve structure is characterised in that the mobile-disk holder has, on the side facing the fixed disk, a body that is (Continued)

closed or is provided with one or more cavities and is configured so as to reduce the useful area of passage of the mixing opening.

2 Claims, 5 Drawing Sheets

(52) U.S. Cl.
    CPC .............. *Y10T 137/86815* (2015.04); *Y10T 137/86831* (2015.04); *Y10T 137/87579* (2015.04)

(58) Field of Classification Search
    USPC .............................. 137/625.4, 625.42, 603
    See application file for complete search history.

(56) References Cited

U.S. PATENT DOCUMENTS

| | | | | |
|---|---|---|---|---|
| 4,301,836 A | | 11/1981 | Hunziker | |
| 4,327,771 A | * | 5/1982 | Nikolayczik | F16K 47/02 137/625.4 |
| 4,596,376 A | * | 6/1986 | Knapp | F16K 11/0782 137/625.17 |
| 4,657,045 A | * | 4/1987 | Kitamura | F16K 11/0787 137/625.17 |
| 4,676,270 A | * | 6/1987 | Knapp | F16K 11/0782 137/270 |
| 4,733,688 A | * | 3/1988 | Lorch | F16K 11/0704 137/454.6 |
| 4,854,347 A | * | 8/1989 | Knapp | F16K 47/026 137/625.4 |
| 4,942,902 A | * | 7/1990 | Knapp | F16K 11/0782 137/270 |
| 4,986,306 A | * | 1/1991 | Ferrari | F16K 11/0787 137/625.17 |
| 8,375,974 B2 | * | 2/2013 | Yan | F16K 11/0743 137/100 |

FOREIGN PATENT DOCUMENTS

| | | |
|---|---|---|
| DE | 3202113 A1 | 11/1982 |
| DE | 3428286 A1 | 2/1986 |
| DE | 102014000840 B3 | 3/2015 |
| EP | 0059697 A1 | 9/1982 |
| EP | 0551059 A2 | 7/1993 |
| EP | 0551059 B1 | 4/1997 |
| EP | 3093540 A1 | 11/2016 |
| EP | 3181963 A1 | 6/2017 |

OTHER PUBLICATIONS

English Abstract for DE 3428286 A1 dated Feb. 6, 1986.
English Abstract for CH 630711 A5 dated Jun. 30, 1982.
English Abstract for DE 3012547 A1 dated Oct. 8, 1981.
English Abstract for DE 3202113 A1 dated Nov. 11, 1982.
English Machine Translation of Abstract for DE 102014000840 B3 dated Mar. 12, 2015.

* cited by examiner

SINGLE CONTROL MIXER VALVE STRUCTURE FOR TAPS AND FITTINGS

FIELD OF THE INVENTION

The subject of the present invention is a single control mixer valve structure for taps and fittings.

As is known, in the tap and fitting sector, mixer cartridges, with disks made of ceramic or some other material, have long been used for single control taps and fittings.

The above mixer cartridges are devised for mixing hot water and cold water, gradually passing from a lower temperature to a higher temperature and vice versa, both at complete opening and with more or less partialised openings.

Conventional cartridges have the outlet for the mixed water arranged on their bottom or on their sides, a dynamic-seal system guaranteed by the ceramics and one or more static seals.

The increasing shortage of drinking water, which in some areas of the world is reaching critical values, has pushed the governments of many countries to introduce legislative interventions aimed at reducing the waste of this extremely precious asset.

To tackle the problem of reduction of water consumption, for about a decade mixer valves have been proposed provided with various control systems: the so-called "click clack" system, having a point which opposes resistance to the movement of the control lever and overstepping of which signals excessive consumption of water; a fixed limitation of the opening of the cartridge; aerators that choke the outlet of the tap, and flow-reduction valves applied to the outlet of the ceramic-disk cartridge.

The majority of the aforesaid arrangements can, however, be easily removed and/or deactivated by the user, whereas others have a very limited duration; finally, some are subject to decline in performance due to the debris present in the water that comes to clog the system.

An ideal solution would be the creation of a new mixer valve with reduced flow rate that can overcome the problems set forth above; however, this would entail a modification in the processes of production of the taps and non-interchangeability on existing products.

Moreover, the creation of a new product entails considerable investments both for design and for its industrialisation.

SUMMARY OF THE INVENTION

The aim of the present invention is to provide a single control mixer valve structure for taps and fittings that will overcome the drawbacks of the prior art mentioned above.

Within this aim, an object of the present invention is to provide a new valve structure by operating on one or more existing products with modification of just one component, designed to limit the delivery performance of water, variable according to an appropriate sizing.

An important object of the present invention is to provide a structure that will enable limiting the delivery of water by the tap in a durable way, without allowing removal of the limiter, while maintaining perfect interchangeability of the cartridge.

A further object of the present invention is to provide a structure that will enable considerable reduction of the manufacturing costs of the taps, enabling manufacturers to use standard accessories or manufacturing processes that are simpler and standardized for the different markets.

Another object of the present invention is to provide a structure that, on account of its peculiar characteristics of implementation, will be able to ensure the widest guarantees of reliability and safety in use.

The above and other objects, which will appear more clearly hereinafter, are achieved by a single control mixer valve structure for taps and fittings comprising a fixed disk provided with an outlet port and two ports, respectively, one for the hot water and the other for the cold water that come from two inlet openings, which are formed in a base, mounted in which is the aforesaid fixed disk; a mobile disk mounted in a mobile-disk holder being slidable on said fixed disk; said mobile-disk holder and said mobile disk defining a mixing opening, which is adapted to connect said inlet openings with an outlet opening, formed in said base, in a position corresponding to said outlet hole on said fixed disk, from which the mixed water flows out; sliding of said mobile disk on said fixed disk determining partial opening or complete closing of one or both of the aforesaid ports of the fixed disk, thus adjusting the amount of hot and cold water that passes from the inlet openings to the outlet opening for the mixed water; said mixer valve structure being characterised in that said mobile-disk holder has, on the side facing said fixed disk, a body that is closed or is provided with one or more cavities; said body being configured so as to reduce the useful area of passage of said mixing opening.

BRIEF DESCRIPTION OF THE DRAWINGS

Further characteristics and advantages of the present invention will become more apparent from an examination of the description of a preferred, but non-exclusive, embodiment of the present invention, illustrated by way of indicative and non-limiting example in the attached drawings, wherein.

DESCRIPTION OF THE PREFERRED EMBODIMENT

Figure 1:
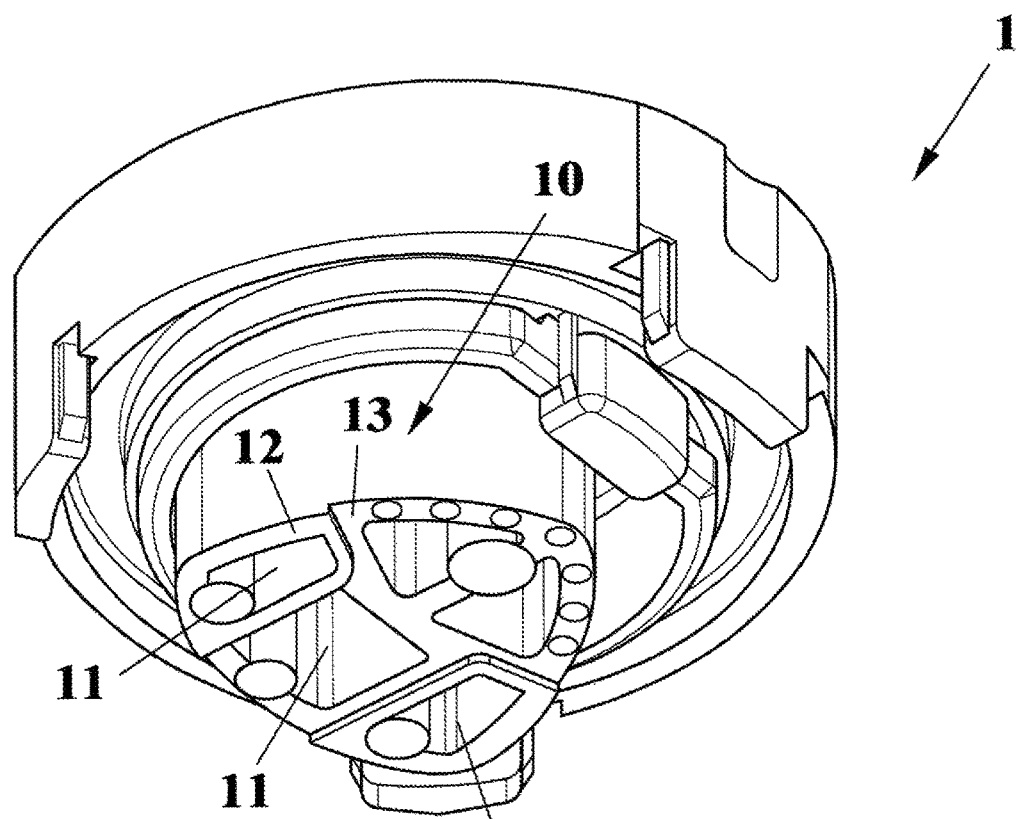
FIG. 1 is a perspective view from beneath of a mobile-disk holder according to the present invention.
Figure 2:
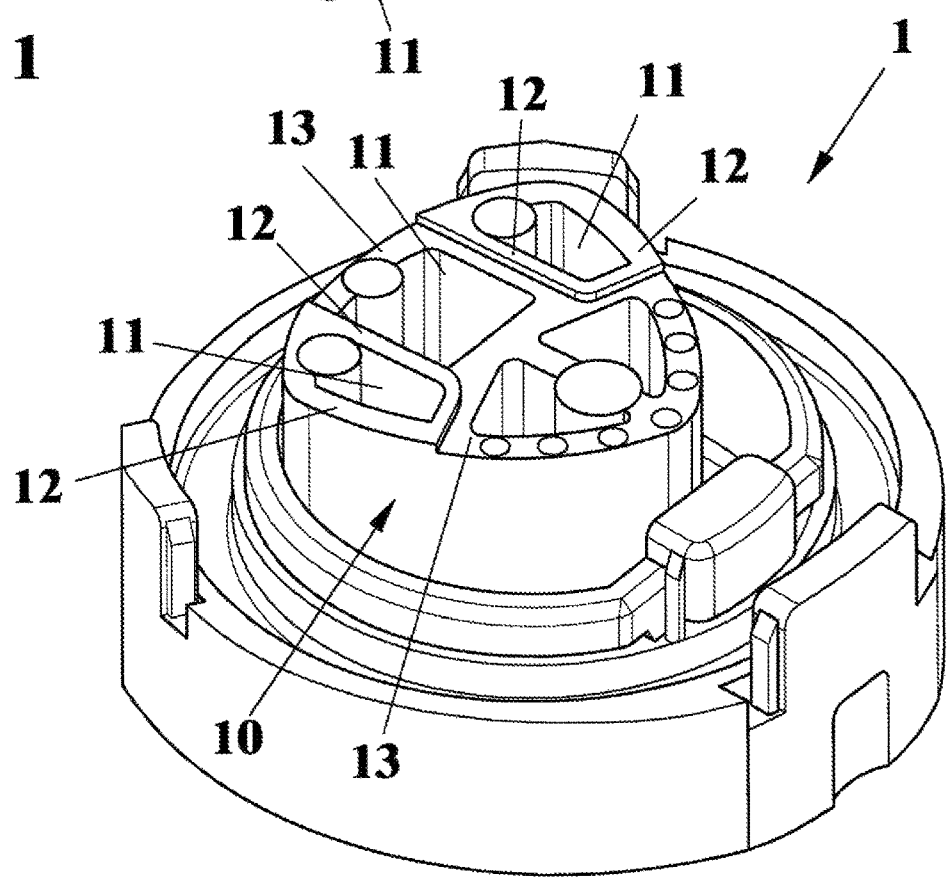
FIG. 2 is another perspective view of the mobile-disk holder.
Figure 3:
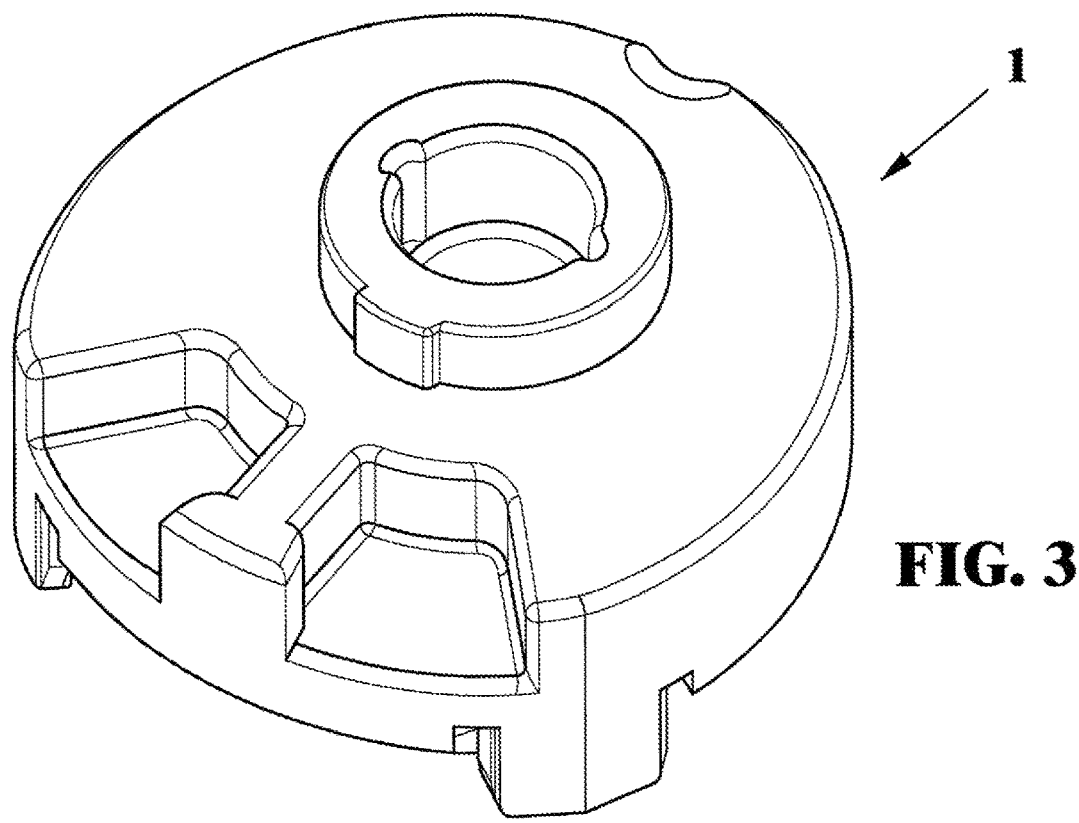
FIG. 3 is a perspective view of the top part of the mobile-disk holder of FIG. 2.
Figure 4:
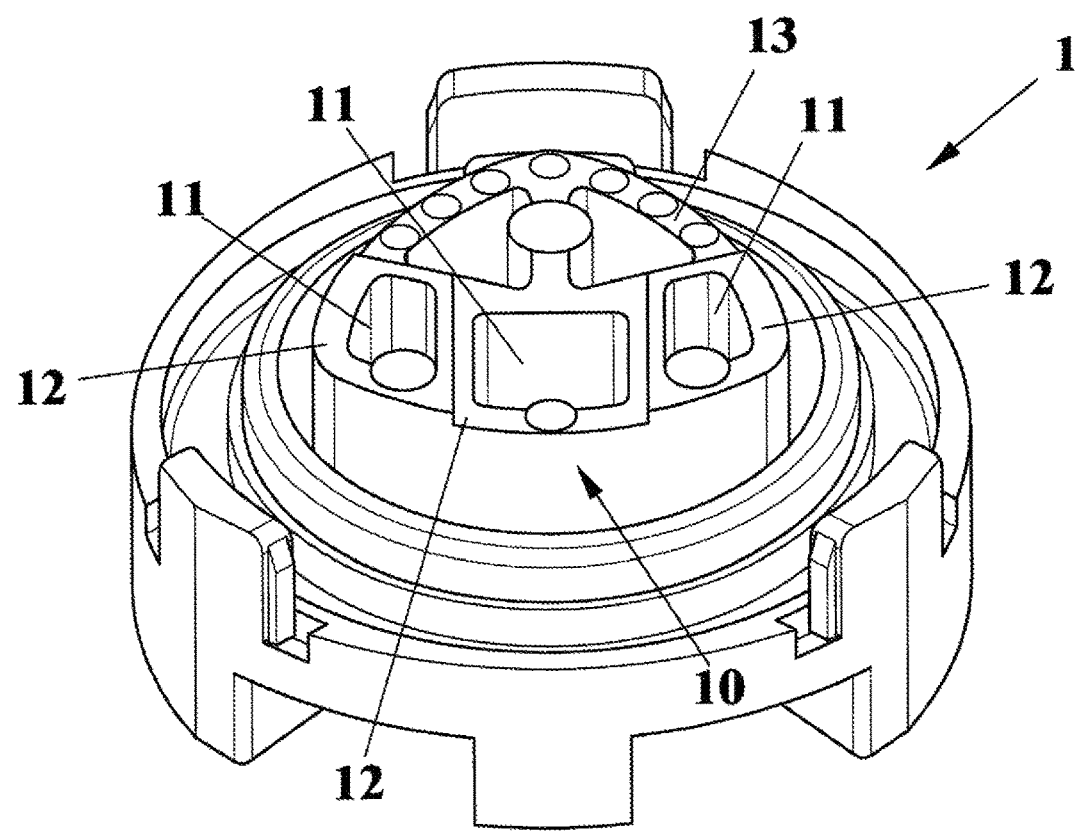
FIG. 4 is another perspective view of the mobile-disk holder.
Figure 5:
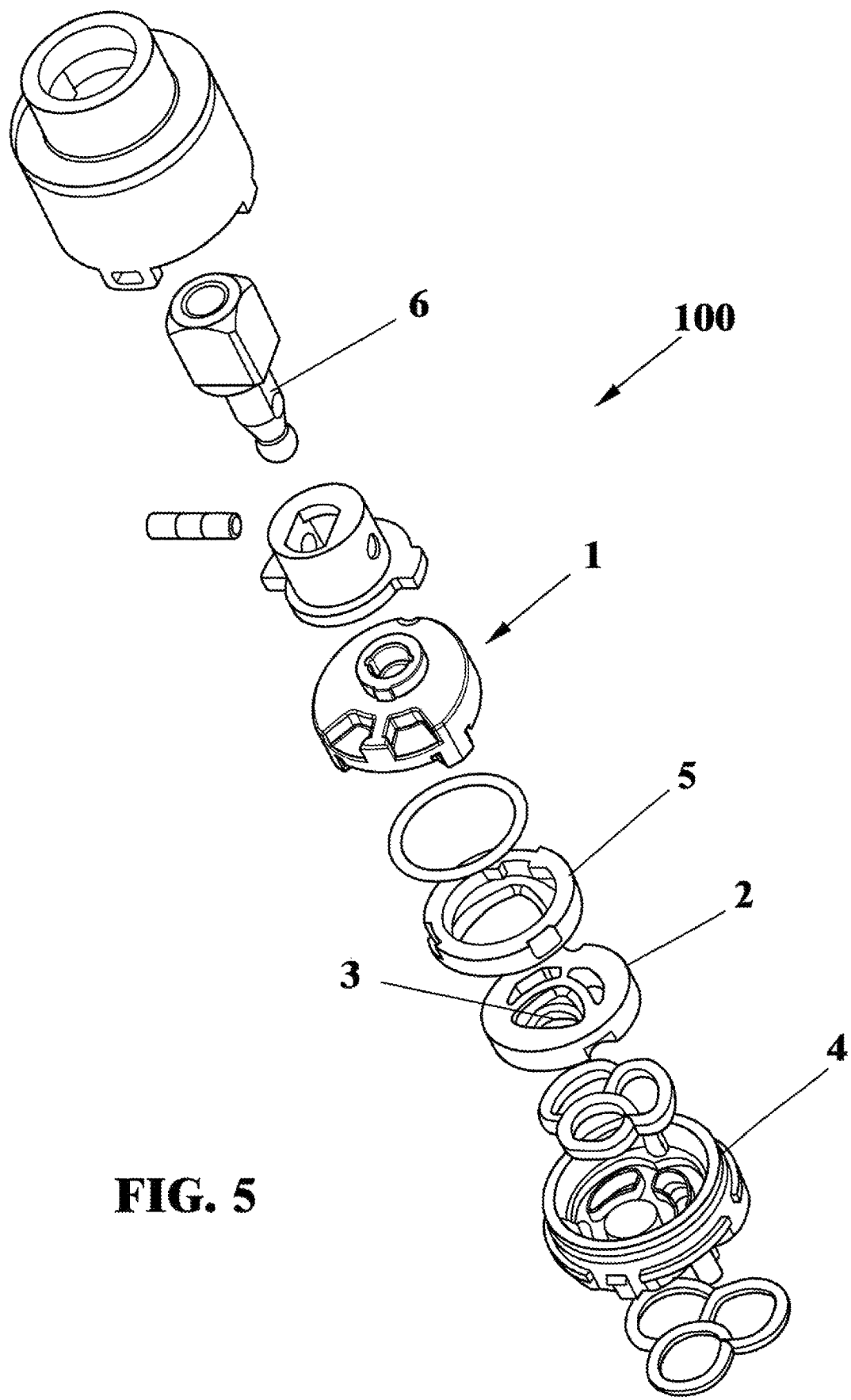
FIG. 5 is an exploded perspective view of a mixer valve structure according to the present invention.

With particular reference to the reference numbers appearing in the aforesaid figures, the single control mixer valve structure, in particular for taps and fittings, according to the present invention, designated as a whole by the reference number 100, comprises a fixed disk 2 provided with an outlet port 3 and two ports, respectively, one for the hot water and the other for the cold water that come from two inlet openings, which are formed in a base 4, in which the fixed disk 2 is mounted.

A mobile disk 5, mounted in a mobile-disk holder 1, is slidable on the fixed disk 2.

The mobile-disk holder 1 and the mobile disk 5 define a mixing opening 8, which is adapted to connect the inlet openings with an outlet opening 7, formed in the base 4, in a position corresponding to the outlet hole 3 on the fixed disk 2, from which the mixed water comes out.

The mobile-disk holder 1 and the mobile disk 5 are driven by a control rod 6, in a way in itself known.

Sliding of the mobile disk 5 on the fixed disk 2 causes partial opening or complete closing of one or both of the ports of the fixed disk 2, thus adjusting the amount of hot and cold water that passes from the inlet openings to the outlet opening 7 for the mixed water.

According to the present invention, the mobile-disk holder 1 has, on the side facing the fixed disk 2, a body 10 that is closed or is provided with one or more cavities 11, defined by separation walls and projections 12, 13 having variable height.

Illustrated in the figures is an embodiment in which the body 10 has three cavities 11 defined by separation walls 12 having a height different from that of the perimetral and central separation wall 13 of the body 10.

The body 10 is configured so as to reduce the useful area of passage of the mixing opening 8.

The reduction of the useful area of passage of the mixing opening 8 may be varied in the design stage according to the requirements by modifying the dimensions of the body 8, the number and dimensions of the cavities 11, and the heights of the separation walls 12 and 13.

Figure 6:
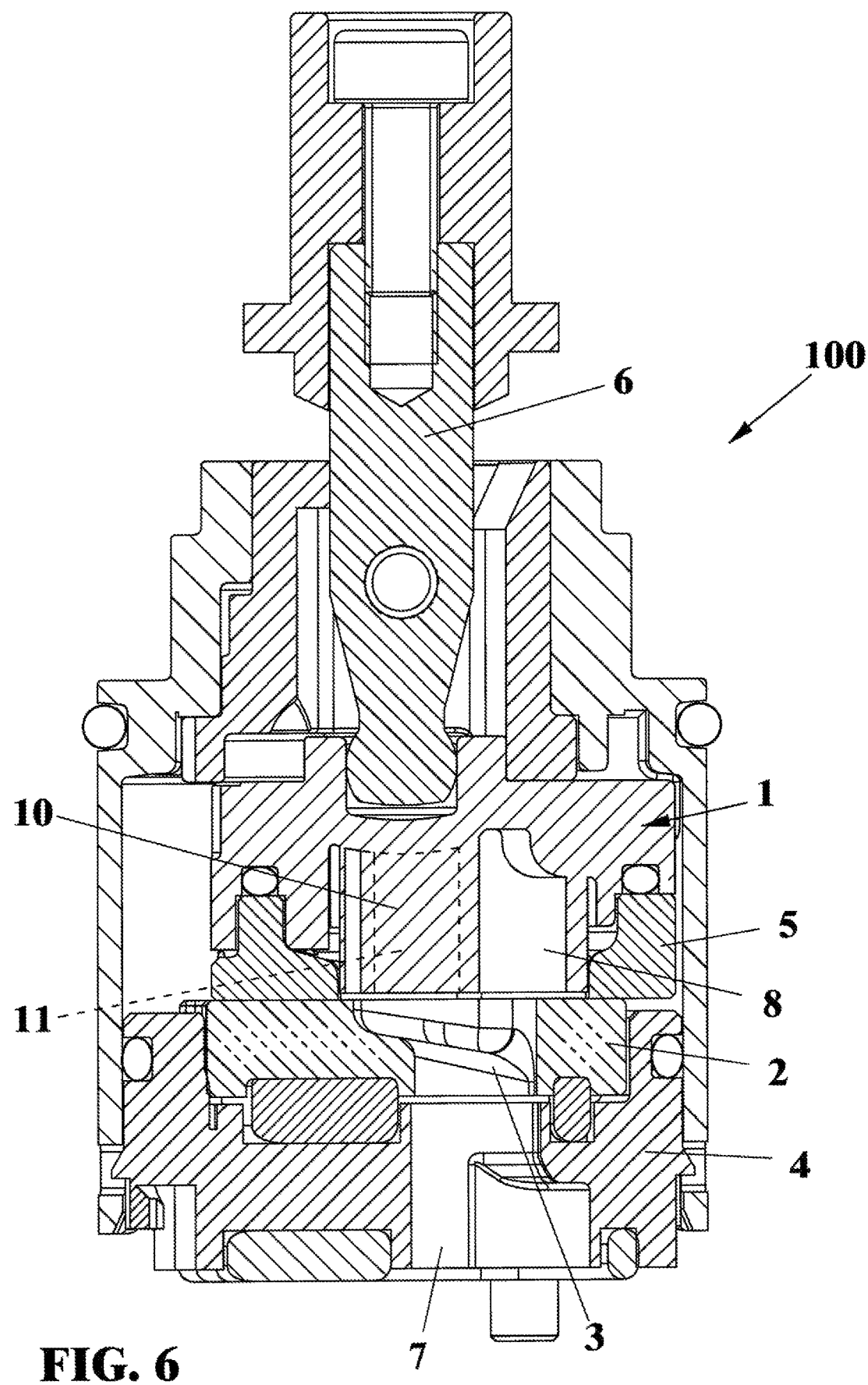
FIG. 6 is a section view of the mixer valve structure according to the present invention.

From FIG. 6 it is evident how the body 10 obstructs what, in a conventional mixer valve structure, is a very large cavity.

Figure 7:
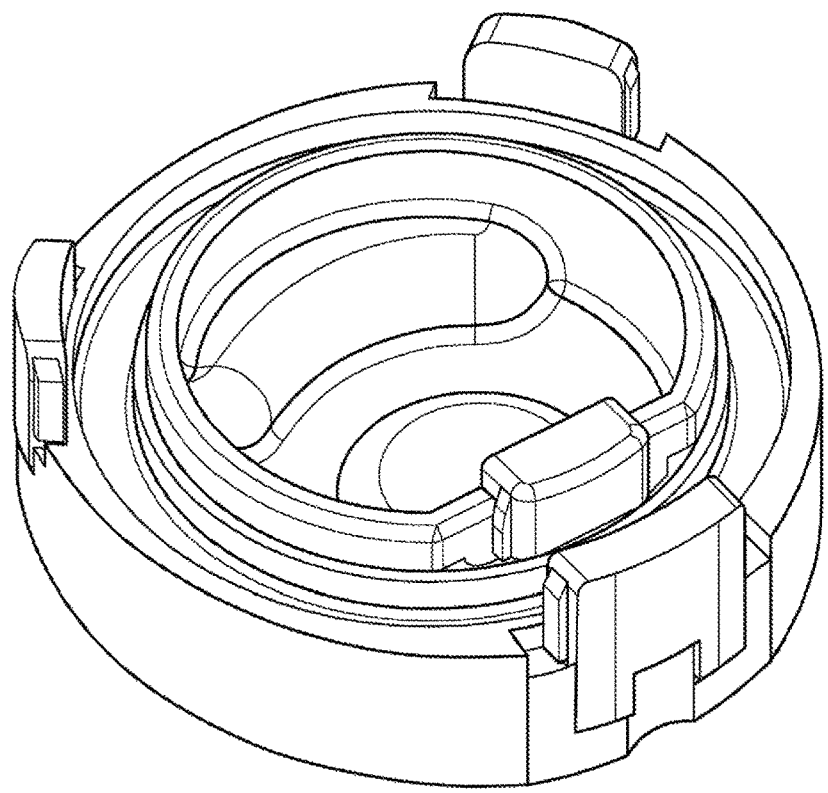
FIGS. 7 and 8 show a mobile-disk holder of a conventional mixer valve.
Figure 8:
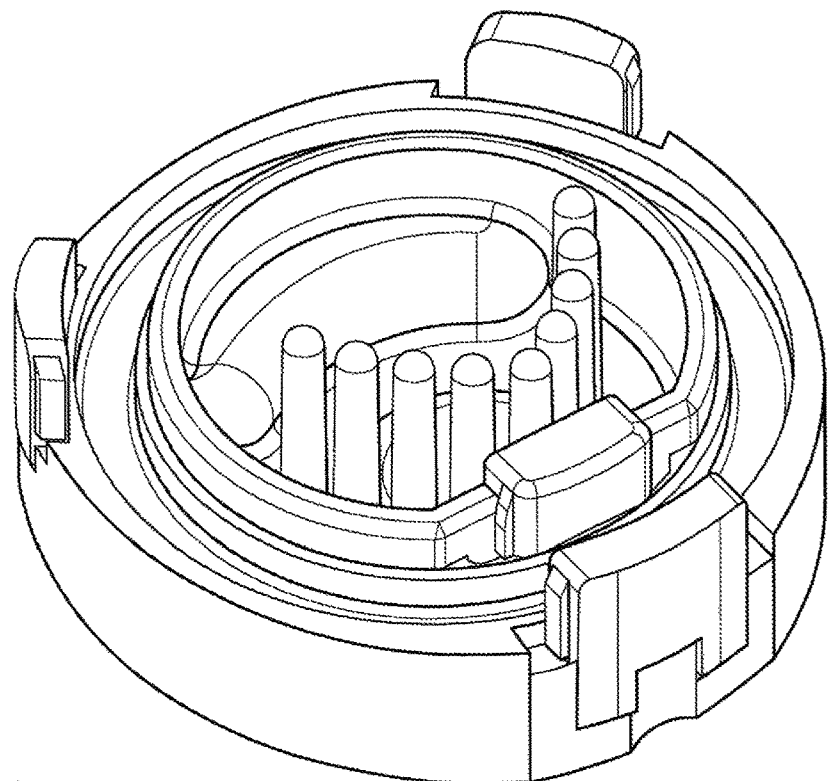

FIGS. 7 and 8 show a mobile-disk holder of a conventional type which, not being provided with the interference body according to the present invention, enables free circulation of a large amount of water.

It may in practice be noted how the present invention achieves the intended aim and objects.

A novel mixer valve structure is in fact provided, which is characterised by the presence of a mobile-disk holder suitably modified so as to limit delivery of water by the tap in a durable way.

The novel structure according to the present invention provides important advantages at the production, functional, and management levels, thanks to the fact that just one component is modified with respect to a conventional structure.

The new component enables limitation of delivery of water by the tap, in a variable way according to the appropriate sizing.

A further advantage of the present invention is represented by the fact that the limiter device cannot be removed and, in any case, maintains perfect interchangeability of the cartridge.

Moreover, the present invention affords considerable reduction in the production costs of the taps because it enables manufacturers to use standard accessories, for example aerators, and production processes that are simpler and standardized for the different markets.

Of course, the materials used, as well as the dimensions, may be any, according to the requirements.

The invention claimed is:

1. A single control mixer valve structure for taps and fittings comprising a fixed disk (2) provided with an outlet port (3) and two ports, respectively, one for the hot water and the other for the cold water that come from two inlet openings, formed in a base (4) in which said fixed disk (2) is mounted; a mobile disk (5) mounted in a mobile-disk holder (1) being slidable on said fixed disk (2); said mobile-disk holder (1) and said mobile disk (5) defining a mixing opening (8), which is adapted to connect said inlet openings with an outlet opening (7), formed in said base (4), in a position corresponding to said outlet hole (3) on said fixed disk (2), from which the mixed water flows out; sliding of said mobile disk (5) on said fixed disk (2) causing partial opening or complete closing of one or both of said ports of the fixed disk (2), thus adjusting the amount of hot and cold water that passes from the inlet openings to the outlet opening (7) for the mixed water; said mixer valve structure being characterised in that said mobile-disk holder (1) has, on the side facing said fixed disk (2), a body (10) that is provided with a plurality of cavities (11); said body (10) being configured so as to extend into said mixing opening (8) of said mobile disk (5) to reduce the useful area of passage of said mixing opening (8); said cavities (11) being defined by separation walls (12, 13) of said body (10), said separation walls extending into said mixing opening (8) of said mobile disk (5), said body (10) comprising three cavities (11), including a central cavity of said three cavities (11) being defined by a central separation wall (13) arranged completely perimetrically around said central cavity, and two peripheral cavities of said three cavities (11) being defined by peripheral separation walls (12) arranged respectively completely perimetrically around said two peripheral cavities, said peripheral separation walls (12) each having a height greater than a height of said central separation wall (13).

2. The single control mixer valve structure according to claim 1, characterised in that said mobile-disk holder (1) and said mobile disk (5) are driven by a control rod (6).

* * * * *